(12) United States Patent
Wang et al.

(10) Patent No.: US 11,566,960 B1
(45) Date of Patent: Jan. 31, 2023

(54) SIMULATION PLATFORM AND SIMULATION METHOD FOR LEAKAGE DETECTION AND TREATMENT

(71) Applicant: Chengdu University of Technology, Chengdu (CN)

(72) Inventors: Xiangpeng Wang, Chengdu (CN); Kunpeng Wang, Chengdu (CN); Xuben Wang, Chengdu (CN); Jin Hu, Deyang (CN); Qiangqiang Tang, Chengdu (CN); Ning Chen, Chengdu (CN); Lingze Li, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 17/844,217

(22) Filed: Jun. 20, 2022

(30) Foreign Application Priority Data

Feb. 21, 2022 (CN) .......................... 202210154188.X

(51) Int. Cl.
*G01M 3/16* (2006.01)

(52) U.S. Cl.
CPC ..................................... *G01M 3/16* (2013.01)

(58) Field of Classification Search
None
See application file for complete search history.

(56) References Cited

U.S. PATENT DOCUMENTS

| 4,024,758 | A | * | 5/1977 | Latimer | .................. | G01C 25/00 |
| | | | | | | 73/170.32 |
| 2015/0337511 | A1 | * | 11/2015 | McCray | .................. | C02F 3/109 |
| | | | | | | 405/15 |

FOREIGN PATENT DOCUMENTS

| CN | 1920178 A | 2/2007 |
| CN | 101110175 A | 1/2008 |
| CN | 101763765 A | 6/2010 |
| CN | 101813605 A | 8/2010 |
| CN | 102889967 A | 1/2013 |
| CN | 103091214 A | 5/2013 |
| CN | 103221359 A | 7/2013 |
| CN | 103760089 A | 4/2014 |
| CN | 103980970 A | 8/2014 |
| CN | 104111152 A | 10/2014 |
| CN | 105136638 A | 12/2015 |

(Continued)

OTHER PUBLICATIONS

First Office Action issued in counterpart Chinese Patent Application No. 202210154188.X, dated Apr. 7, 2022.

*Primary Examiner* — Alexander A Mercado
(74) *Attorney, Agent, or Firm* — Westbridge IP LLC

(57) ABSTRACT

Disclosed are a simulation platform and a simulation method for leakage detection and treatment. The simulation platform includes a water tank open at the top, which is a holding device; simulation sand, which is laid at the bottom of the water tank, and the upper area of the simulation sand is the experimental water filling area for filling simulation water; a leakage simulation device, which is buried in the simulation sand; a plurality of electrodes, which are distributed on the simulation sand for collecting and sending potential and current signals to a data processing terminal; a hydraulic brake, which is arranged in the experimental water filling area and used for stirring the simulation water; the hydraulic brake is not turned on in the static water environment simulation, and is turned on in the dynamic water environment simulation.

7 Claims, 5 Drawing Sheets

(56) References Cited

FOREIGN PATENT DOCUMENTS

| | | |
|---|---|---|
| CN | 105136641 A | 12/2015 |
| CN | 105422090 A | 3/2016 |
| CN | 105489100 A | 4/2016 |
| CN | 105675237 A | 6/2016 |
| CN | 205538580 U | 8/2016 |
| CN | 106442257 A | 2/2017 |
| CN | 107703045 A | 2/2018 |
| CN | 207379888 U | 5/2018 |
| CN | 108318386 A | 7/2018 |
| CN | 207714393 U | 8/2018 |
| CN | 108570961 A | 9/2018 |
| CN | 108593220 A | 9/2018 |
| CN | 110243559 A | 9/2019 |
| CN | 110470598 A | 11/2019 |
| CN | 110632131 A | 12/2019 |
| CN | 110836844 A | 2/2020 |
| CN | 111099856 A | 5/2020 |
| CN | 111366303 A | 7/2020 |
| CN | 211603186 U | 9/2020 |
| CN | 111931262 A | 11/2020 |
| CN | 112236218 A | 1/2021 |
| CN | 112533547 A | 3/2021 |
| CN | 112665806 A | 4/2021 |
| CN | 112798492 A | 5/2021 |
| CN | 113758645 A | 12/2021 |
| CN | 114046943 A | 2/2022 |
| TW | 200528587 A | 9/2005 |

\* cited by examiner

SIMULATION PLATFORM AND SIMULATION METHOD FOR LEAKAGE DETECTION AND TREATMENT

CROSS-REFERENCE TO RELATED APPLICATIONS

This application claims priority to Chinese Patent Application No. 202210154188.X, filed on Feb. 21, 2022, the contents of which are hereby incorporated by reference.

TECHNICAL FIELD

The application belongs to the technical field of water conservancy project reservoir leakage detection, and particularly relates to a simulation platform and a simulation method for leakage detection and treatment.

BACKGROUND

There are many drinking water irrigation and natural rivers in China. In areas with freeze-thaw cycles and flood-prone areas, problems such as hollowing and cracks in riverbanks and riverbeds are easy to occur. Since 1990s, China began to build quite many hydropower stations. At present, there are more than 30 large-scale and super-large hydropower stations in operation, which more or less have problems such as leakage and side leakage during the 30 years of operation. There are many natural reservoirs and artificial reservoirs in China, which will lead to more or less inhomogeneity and incomplete geological conditions of address selection during the construction of artificial reservoirs, resulting in disasters. When natural reservoirs are affected by storms, earthquakes and other disasters, there will be cracks, uneven settlement and other problems.

At present, the detection technology and treatment methods for leakage in rivers, power stations, reservoirs, etc. are not perfect, especially the underwater detection technology needs to be further improved. However, laboratory simulation and experimental underwater detection technology for leakage in rivers, power stations, reservoirs, etc. are rarely mentioned. The patent with patent number CN202010242448.X discloses a simulation platform, an experimental system and a method for reservoir leakage detection experiment. The disclosed experimental platform for reservoir leakage detection cannot simulate the dynamic water environment such as rivers, but can only simulate the leakage at the bottom of reservoirs, and can't simulate the leakage at any position on the bottom and four walls of rivers, reservoirs, power stations, etc.; only simulates the leakage at the bottom of the reservoir, but does not involve the detecting test system of the leakage position, or the experimental simulation of the treatment of the leakage problem.

SUMMARY

The objective of the application is to provide a simulation platform and a simulation method for leakage detection and treatment, so as to meet the experimental research of leakage detection and treatment methods and technologies, and solve the problem that at present, physical laboratory simulation and numerical simulation can't be effectively carried out for leakage problems of rivers, power stations, reservoirs and the like, and technical research can't be effectively carried out.

In order to realize the objective of the application, the adopted technical scheme is as follows.

The application firstly provides a simulation platform for leakage detection and treatment, which includes:

a water tank open at the top, which is a holding device;

simulation sand, which is laid at the bottom of the water tank, and the upper area of the simulation sand is the experimental water filling area for filling simulation water;

a leakage simulation device, which is buried in the simulation sand; the leakage simulation device is used as a low-resistance body to simulate leakage, and is a low-resistance cement test block containing steel fibre or graphite;

a plurality of electrodes, which are distributed on the simulation sand for collecting and sending potential and current signals to a data processing terminal;

a hydraulic brake, which is arranged in the experimental water filling area and used for stirring the simulation water; the hydraulic brake is not turned on in the static water environment simulation, and is turned on in the dynamic water environment simulation.

As a further optional scheme, the simulation platform further includes:

a solidified layer, which is laid on the top surface layer of the simulation sand, and the thickness of the solidified layer is 5-15 mm As a further optional scheme, the hydraulic brake is made of insulating material and includes:

a fan blade, which is located in the experimental water filling area;

a connecting rod, one end of which passes through a side wall of the water tank and is connected with the fan blade, and the other end extends out of the side wall;

a handle, which is connected with the connecting rod extending out of the side wall;

the handle rotates the connecting rod to drive the fan blade to rotate and stir the simulation water in the experimental water filling area in the water tank.

As a further optional scheme, the two ends of the electrode are respectively:

a working terminal which is inserted into the simulation sand to collect potential and current signals; and a connection terminal which receives and sends potential and current signals to the data processing terminal;

the working terminal is electrically connected with the connecting terminal

As a further optional scheme, the working terminal includes: an insulating section with a built-in connecting line; a non-insulating tip fixedly arranged at the bottom of the insulating section and connected with the connecting line;

The connection terminal includes: a cable connected between the working terminal and the connection terminal for transmitting potential and current signals; a host connection plug, and the cable is connected with the data processing terminal through the host connection plug.

As a further optional scheme, the water tank includes:

a fixed frame, which is used as a keel of the water tank; and a plurality of wooden boards, which are fixed on the fixed frame and form a tank body of the water tank.

As a further optional scheme, the leakage simulation device is one of a low-resistance cement test block containing steel fiber, graphite, or a low-resistance cylindrical cement block containing steel fiber or graphite.

As a further optional scheme, the simulation sand is a plane or a stepped surface.

The application also provides a simulation method using the simulation platform for leakage detection and treatment, including the following steps:

S1, laying simulation sand in the water tank according to the bottom sediment topography environment, embedding the leakage simulation device simulating actual leakage in the simulation sand, inserting a plurality of electrodes into the simulation sand, and loading natural river water into the experimental water filling area in the water tank;

S2, dividing the water environment into static water environment simulation and dynamic water environment simulation; the hydraulic brake being not turned on in static water environment simulation, and the hydraulic brake being turned on in dynamic water environment simulation; and S3, obtaining abnormal values at the leakage simulation device by collecting the potential and current signals in the simulation sand using the electrodes, so as to realize the simulation of the actual leakage situation and the experimental detection of the leakage point; when simulating the actual leakage treatment, taking an electrode installation position near a leakage point as a grouting position, taking out the electrode close to the leakage point, and grouting the leakage point through the electrode insertion hole on the simulation sand, so as to block the leakage point and simulate the actual leakage treatment.

As a further optional scheme, the height of the simulation sand at the bottom of the water tank is not less than 0.4 m, and the simulation sand is river sand, the shape of the simulation sand is suitable for the bottom sediment topography.

The application has the beneficial effects that through the arrangement of the water tank structure, the double physical re-simulation of the dynamic water and static water environment of the leakage bodies such as rivers, power stations and reservoirs can be realized, and when the actual leakage problem is simulated by laboratory measurement, the leakage at different positions at the bottom and four walls of rivers, power stations and reservoirs can be simulated at the same time. It can provide new ideas and simulation devices for solving the leakage problems of rivers, power stations, reservoirs, etc. It provides new ideas and simulation devices for understanding the basic principles, and can meet the experimental research of leakage detection and treatment methods and technologies.

BRIEF DESCRIPTION OF THE DRAWINGS

In order to explain the technical scheme of the present application more clearly, the following will briefly introduce the drawings that need to be used in the description of the embodiments. It should be understood that the drawings in the following description are some embodiments of the present application. For those of ordinary skill in the art, other drawings can be obtained according to these drawings without any creative effort.

DETAILED DESCRIPTION OF THE EMBODIMENTS

Figure 1:
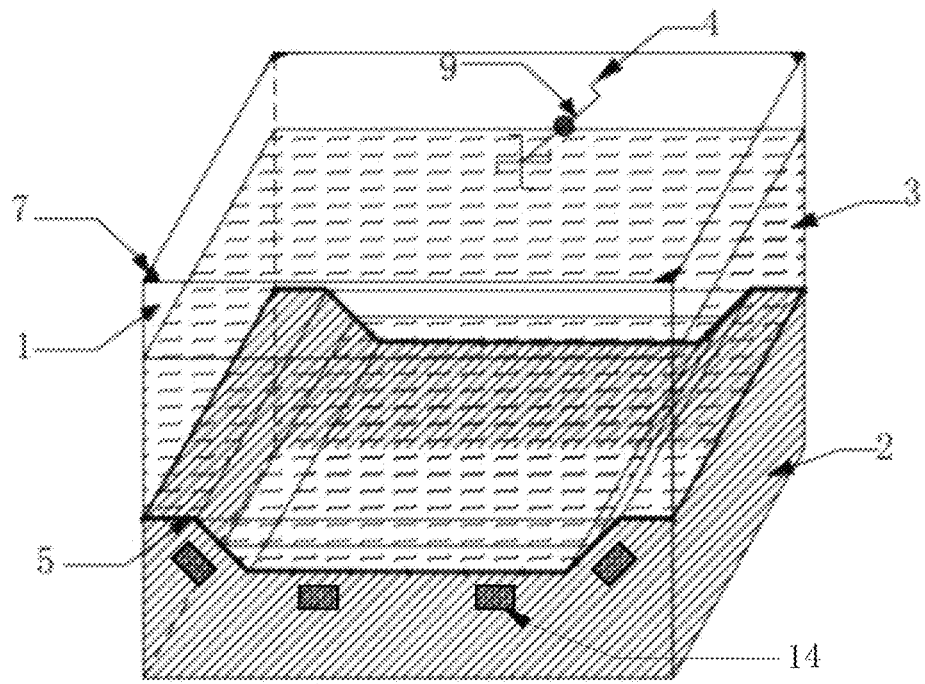
FIG. 1 is a schematic diagram of the structure of the simulation platform for leakage detection and treatment provided by the embodiment of the present application when simulating the river environment, and the water level is higher than the land shore part.

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labour belong to the protection scope of the present application. It can be understood that the drawings are for reference and illustration only, and are not intended to limit the application. The connections shown in the drawings are only for the convenience of clear description, and do not limit the connection mode.

It should be noted that when one component is considered to "be connected with" another component, it may be directly connected to another component, or there may be intervening components at the same time. Unless otherwise defined, all technical and scientific terms used herein have the same meanings as commonly understood by those skilled in the technical field of the present application. The terminology used in this specification of the present application is only for the purpose of describing specific embodiments, and is not intended to limit the present application.

The application will be further explained with reference to the following drawings and specific embodiments.

Embodiment 1

FIGS. 1 to 5 show the structural schematic diagram of the simulation platform for leakage detection and treatment provided by the present application. This embodiment provides a simulation platform for leakage detection and treatment, which includes:

a water tank 1 open at the top, which is a holding device;

simulation sand 2, which is laid at the bottom of the water tank, and the upper area of the simulation sand is the experimental water filling area for filling simulation water 3;

a leakage simulation device 14, which is buried in the simulation sand;

a plurality of electrodes 6, which are distributed on the simulation sand for collecting and sending potential and current signals to a data processing terminal;

a hydraulic brake 4, which is arranged in the experimental water filling area and used for stirring the simulation water; the hydraulic brake is not turned on in the static water environment simulation, but turned on in the dynamic water environment simulation.

As shown in FIG. 1, the simulation platform includes a water tank 1 open at the top. The bottom of the water tank 1 is paved with simulation sand 2, in which leakage simulation devices 14 are embedded. The upper area of the simulation sand 2 in the water tank 1 is an experimental water filling area, and a plurality of electrodes 6 are distributed on the simulation sand 2. The two ends of the electrodes 6 are working terminals and connecting terminals, respectively. The working terminals are inserted into the simulation sand 2 to collect potential and current signals. The water tank 1 is provided with a hydraulic brake 4 that stirs the simulation water 3 in the experimental water filling area.

Simulation 2 is a simulation of the bottom sediment topography environment, and its shape is suitable for the bottom sediment topography.

Figure 3:
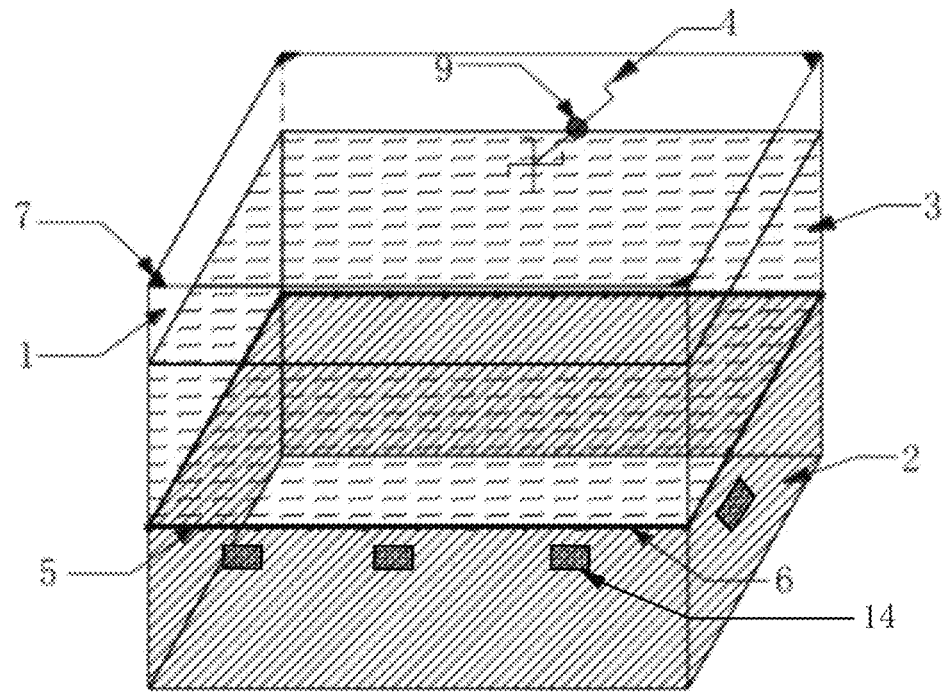
FIG. 3 is a schematic structural diagram of the simulation platform for leakage detection and treatment provided by the embodiment of the present application when simulating the environment of a power station or reservoir.
Figure 4:
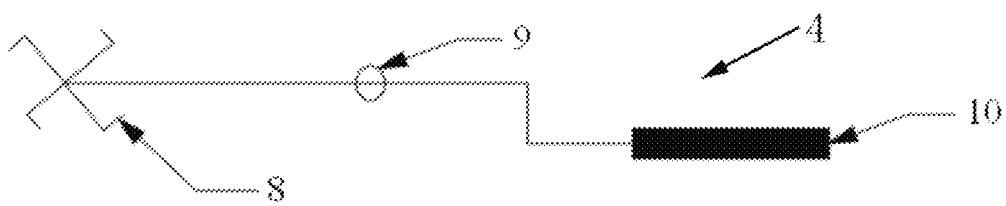
FIG. 4 is a schematic diagram of the hydraulic brake in the simulation platform for leakage detection and treatment provided by the embodiment of the present application.

When simulating the environment at the bottom of power station and reservoir, as shown in FIG. 3, the top of simulation sand 2 can be flat.

Figure 2:
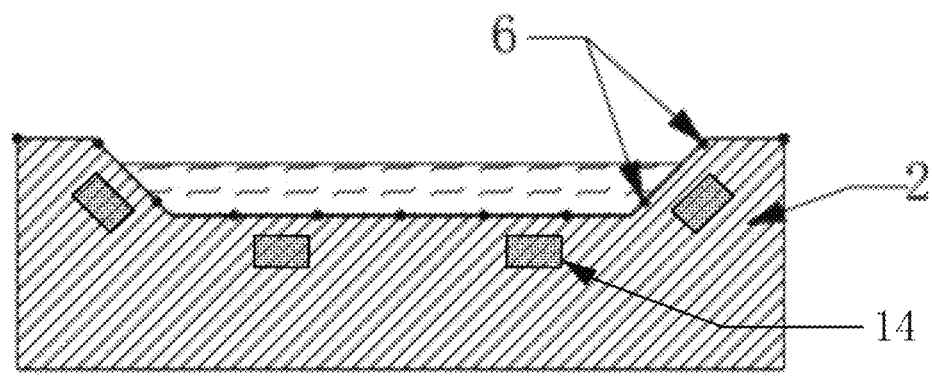
FIG. 2 is a schematic diagram of the simulation sand of the simulation platform for leakage detection and treatment provided by the embodiment of the present application when simulating the river environment, and the water level is lower than the land shore part.

When simulating the river environment, as shown in FIG. 1 and FIG. 2, the simulation sand 2 can be shaped like a river dam with high sides and low middle. At this time, the high part on both sides is the simulated land shore part, and the slope between the low part and the high part is the riverbank on both sides of the simulated river. The electrode 6 in the low part is measured at the bottom of the water, and the electrode 6 in the high part is used to simulate the land measurement, which can simulate the leakage problem in the river, and simultaneously simulate the simultaneous measurement of the water and land.

The thickness and distribution of sand grains may be adjusted according to the experimental needs, and the depth of simulation water 3 can be adjusted according to the actual water storage situation, which can be lower or higher than the simulated land shore part.

In order to better shape and ensure a fixed form when simulating sediment deposition in river beds, hydropower stations and reservoir bottoms, a solidified layer 5 is arranged on the top surface of the simulation sand 2 in the process of simulating different underwater environments, that is, the surface of the simulation sand 2 is reinforced by a curing agent to achieve a stable layer with a thickness of about 0.01 m, so as to meet the requirements of modelling different underwater topography and further realize the simulation of different complex topography underwater.

In order to better simulate the influence of hydrodynamic environment on measurement, a hydraulic brake 4 is set.

When simulating the static water environment of power station, reservoir, etc., the hydraulic brake 4 does not need to be started, and the hydraulic brake 4 is non-metallic.

The hydraulic brake 4 includes a fan blade 8 located in the experimental water filling area, and a connecting rod 9 connected with the fan blade 8. The connecting rod 9 extends through the side wall of the water tank 1 and is connected with a handle 10. There is a plurality of fan blades 8; the handle 10 drives the connecting rod 9 to rotate so as to drive the fan blade 8 to rotate and stir the simulation water 3 in the water tank 1. When simulating the river environment of dynamic water, the inside of the hydraulic brake 4 stirs the simulation water 3 in the water tank 1 through the fan blades 8. A sealing ring can be installed between the connecting rod 9 and the side wall of the water tank 1 for waterproof sealing.

The hydraulic brake 4 is made of insulating material as a whole, so as to avoid affecting the measurement.

The two ends of the electrode are respectively: a working terminal which is inserted into the simulation sand to collect potential and current signals; and a connection terminal which receives and sends potential and current signals to the data processing terminal; the working terminal is electrically connected with the connecting terminal.

As a further optional scheme, the working terminal includes: an insulating section with a built-in connecting line; a non-insulating tip fixedly arranged at the bottom of the insulating section and connected with the connecting line; the connection terminal includes: a cable connected between the working terminal and the connection terminal for transmitting potential and current signals; a host connection plug, and the cable is connected with the data processing terminal through the host connection plug.

Figure 5:
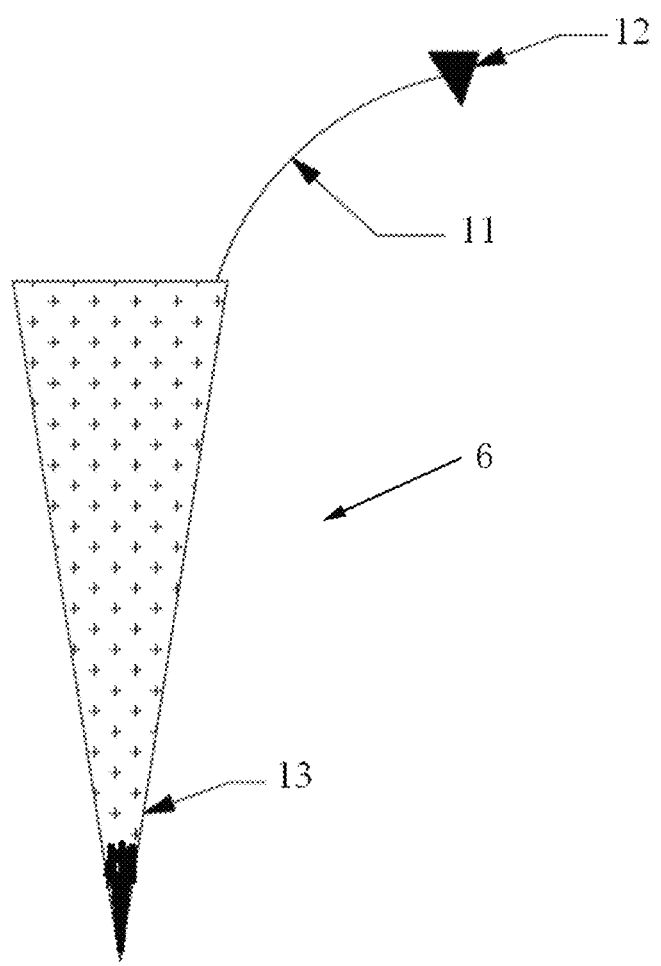
FIG. 5 is a schematic diagram of electrodes in the simulation platform for leakage detection and treatment provided by the embodiment of the present application.

In this embodiment, as shown in FIG. 5, the connecting terminal of the electrode 6 is provided with a cable 11 and a host connection plug 12 on the cable 11. The working terminal is the tip 13, that is, the non-insulated tip, and the part of the electrode 6 except the tip 13 is the insulated section. In this embodiment, the tip 13 can be fixedly installed at the bottom of the insulated section, and it can be connected by a built-in wire or directly by a cable 11. The insulating layer can insulate the part exposed to the simulation water 3 to ensure the accuracy of data acquisition by the electrode 6. The exposed copper wire is located at the tip 13, which is used to go deep into the simulation sand 2 to collect potential and current signals, and the cable 11 is used for signal transmission and connection.

The water tank 1 includes a fixed frame 7 and a plurality of wooden boards, and the wooden boards are fixed on the fixed frame 7 to form a tank body. In the case of more water demand, the lateral stress formed by water and river sand is relatively large. In order to ensure the firmness and safety of the experimental measuring device, a fixed frame 7 is set to improve the safety, and the water tank 1 is formed by installing and manufacturing wooden boards.

The leakage simulator is used as a low-resistance body to simulate leakage, and can be a low-resistance cement test block containing steel fibre or graphite, or a low-resistance cylindrical cement block containing steel fibre or graphite. In this embodiment, metal beads and metal wires are used to simulate the actual leakage holes and cracks, respectively, and they are buried in different positions, so as to meet the requirements of simulating the leakage of different positions at the bottom and four walls of rivers, power stations, reservoirs, etc.

In this embodiment, only riverbed sediment and bottom sediment topography environment of power station or reservoir are used for simulation treatment, but as long as any topography environment can meet the treatment conditions and requirements, the simulation platform for leakage detection and treatment of this application can be used for simulation, and the above example is not limited to it, as long as it can be simulated according to the above-mentioned technology.

Embodiment 2

Using the simulation platform described in Embodiment 1, this embodiment proposes a simulation method of environmental governance.

Figure 8:
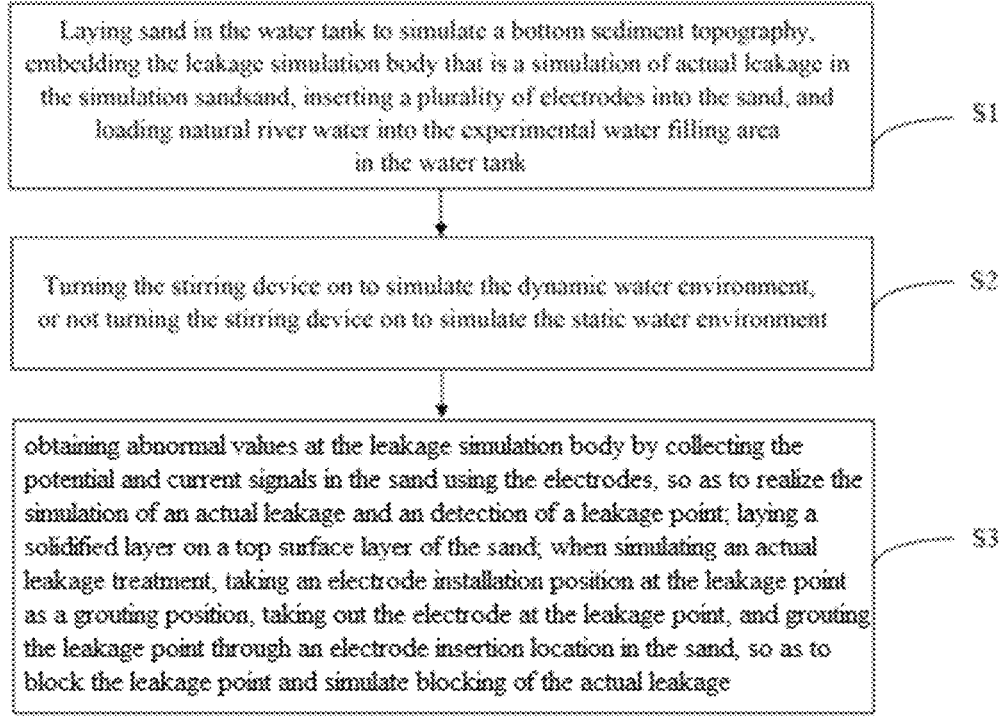
FIG. 8 is a flowchart of a simulation method of leakage detection and treatment provided by the embodiment of the present application.

This embodiment also provides a simulation method of leakage detection and treatment, which includes the following steps as shown in FIG. 8:

S1, laying simulation sand 2 in the water tank 1 according to the bottom sediment topography environment, embedding the leakage simulation device 14 simulating actual leakage in the simulation sand 2, inserting a plurality of electrodes 6 into the simulation sand 2, and loading natural river water into the experimental water filling area in the water tank 1;

S2, dividing the water environment into static water environment simulation and dynamic water environment simulation; the hydraulic brake 4 being not turned on in static water environment simulation, and the hydraulic brake 4 being turned on in dynamic water environment simulation; and S3, obtaining abnormal values at the leakage simulation device 14 by collecting the potential and current signals in the simulation sand 2 using the electrodes 6, so as to realize the simulation of the actual leakage situation and the experimental detection of the leakage point; when simulating the actual leakage treatment, taking an electrode 6 installation position near a leakage point as a grouting position, taking out the electrode 6 close to the leakage point, and grouting the leakage point through the electrode insertion hole on the simulation sand 2, so as to block the leakage point and simulate the actual leakage treatment.

The simulation sand 2 at the bottom of the water tank is not less than 0.4 m. The simulation sand 2 is river sand, and its shape is suitable for the bottom sediment topography.

The electrical characteristic signal is collected by the electrode 6, so as to simulate the actual leakage situation in the laboratory and carry out the experimental detection of the leakage point. When simulating the actual leakage treatment problem for laboratory measurement, grouting is carried out to the leakage point through electrode holes to block the leakage, so as to simulate the filling process of low-resistance geological bodies such as actual leakage holes and fissures with slurry, so as to simulate the actual leakage treatment situation in the laboratory.

Figure 6:
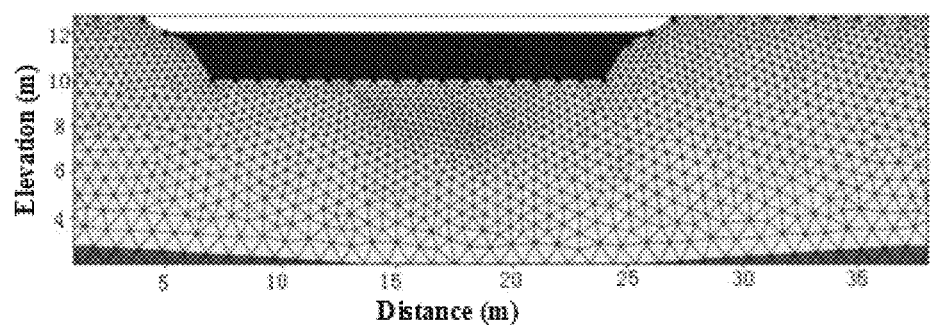
FIG. 6 is an effect diagram of experimental detection of a water tank model by using the simulation platform and method for leakage detection and treatment provided by the embodiment of the application and numerical simulation of water tank model by software.
Figure 7:
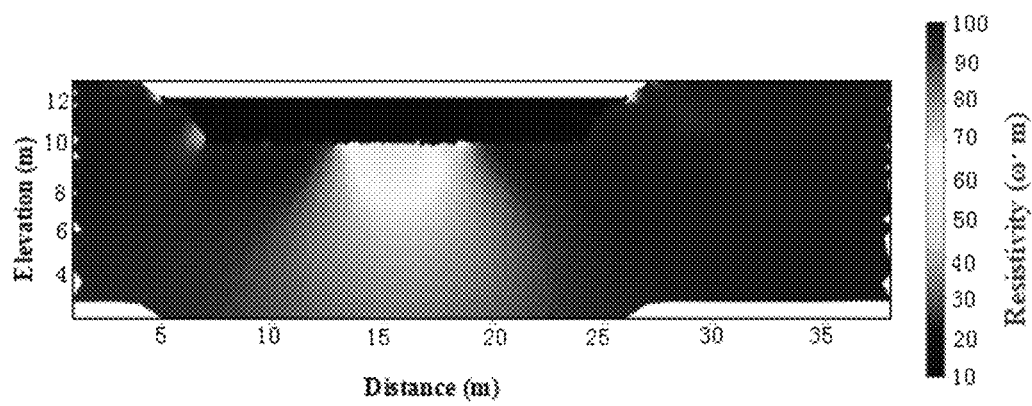
FIG. 7 is an effect diagram of experimental detection and inversion after anomaly detection of simulation results by using the simulation platform and method for leakage detection and treatment provided by the embodiment of the present application.

As shown in FIG. 6 and FIG. 7, the numerical simulation of the water tank model and the inversion of the simulation results after anomaly detection are carried out by the software configured in the terminal respectively during the river course experimental detection. It can be seen that the anomaly in the lower part of the drawing is the leakage point. The numerical simulation shows the location and scope of the leakage point well.

The application is not limited to the above-mentioned alternative embodiments. Anyone can come up with other products in various forms under the inspiration of the application. However, any technical solutions that fall within the scope defined by the claims of the application will fall within the scope of protection of the application, regardless of any changes in their shapes or structures.

What is claimed is:

1. A simulation platform for leakage detection and treatment, comprising:
   a water tank that is open at a top and is used as a holding device;
   sand laid at a bottom of the water tank, wherein an area above the sand is water filling area for filling water;
   a leakage simulation body buried in the sand, wherein the leakage simulation body is used as a conductive body to simulate leakage and is a conductive cement test block containing steel fibre or graphite;
   a plurality of electrodes distributed in the sand for collecting and sending potential and current signals to a data processing terminal; wherein two ends of the electrodes are respectively a working end inserted into the sand to collect potential and current signals and a connection end to receive and send potential and current signals to the data processing terminal; wherein the working end is electrically connected with the connection end; and
   a stirring device arranged in the water filling area to stir the water; wherein the stirring device is not turned on in a simulation of static water environment and is turned on in a simulation of dynamic water environment.

2. The simulation platform for leakage detection and treatment according to claim 1, further comprising:
   a solidified layer laid on a top surface layer of the sand, and a thickness of the solidified layer is 5-15 mm.

3. The simulation platform for leakage detection and treatment according to claim 1, wherein the stirring device is made of an insulating material and comprises:
   a fan blade located in the water filling area;
   a connecting rod that passes through a side wall of the water tank and is connected with the fan blade in one end, and extends out of the side wall in another end; and
   a handle connected with the connecting rod extending out of the side wall, wherein the handle rotates the connecting rod to drive the fan blade to rotate and stir the water in the water filling area in the water tank.

4. The simulation platform for leakage detection and treatment according to claim 1, wherein the water tank comprises:
   a fixed frame of for holding the water tank; and
   a plurality of wooden boards fixed on the fixed frame and form a tank body of the water tank.

5. The simulation platform for leakage detection and treatment according to claim 1, wherein the sand is formed to have a plane or a stepped surface.

6. A simulation method using the simulation platform for leakage detection and treatment according to claim 1, comprising:
   S1, laying sand in the water tank to simulate a bottom sediment topography, embedding the leakage simulation body that is a simulation of actual leakage in the sand, inserting the plurality of electrodes into the sand, and loading natural river water into the water filling area in the water tank;
   S2, turning the stirring device on to simulate the dynamic water environment, or not turning the stirring device on to simulate the static water environment; and
   S3, obtaining abnormal values at the leakage simulation body by collecting the potential and current signals in the sand using the electrodes, so as to realize the simulation of an actual leakage and a detection of a leakage point; laying a solidified layer on a top surface layer of the sand; when simulating an actual leakage treatment, taking an electrode installation position at the leakage point as a grouting position, taking out the electrode at the leakage point, and grouting the leakage point through an electrode insertion hole in the sand, so as to block the leakage point and simulate the actual leakage treatment.

7. The simulation method according to claim 6, wherein a height of the sand at the bottom of the water tank is not less than 0.4 m, the sand is river sand, and the shape of the sand is formed to conform to the shape of the bottom sediment topography.

* * * * *